United States Patent [19]

Ritter

[11] Patent Number: 4,789,486
[45] Date of Patent: Dec. 6, 1988

[54] WATER DESALINIZATION PROCESS

[75] Inventor: Ernesto Ritter, Reforma Ixtacihuatl, Mexico

[73] Assignee: MCM Incorporated, Fairfax, Va.

[21] Appl. No.: 102,733

[22] Filed: Sep. 30, 1987

[51] Int. Cl.$^4$ ................................................ B01D 37/00
[52] U.S. Cl. .................................... 210/747; 210/170; 405/52
[58] Field of Search ............... 210/154, 155, 170, 747; 405/36, 50, 52; 166/278, 228

[56] References Cited

U.S. PATENT DOCUMENTS 4,122,012 10/1978 Vlasnik ................................. 210/170

FOREIGN PATENT DOCUMENTS 0061865 3/1982 Japan .................................... 210/170
1148839 7/1982 U.S.S.R. .............................. 210/170

OTHER PUBLICATIONS

Ziogas, Seacoast Dam Separates Salt Water and Fresh, Feb. 1974 Civil Engineering-ASCE pp. 53-55.

Primary Examiner—Richard V. Fisher
Assistant Examiner—Coreen Y. Lee
Attorney, Agent, or Firm—Frank P. Presta

[57] ABSTRACT

A process for the desalinization of sea water which includes a barrier buried to a depth below the low tide water level in a sandy beach, and a collector vault or well buried in the beach behind the barrier, the well having an opening in its side for receiving water passing through the barrier. The barrier is filled with selected filter materials, and the sand in the area between the barrier and the well is treated with a selected material. The barrier extends through a water-permeable layer of crushed or fossilized shells naturally occurring beneath the sandy beach. The well opening is positioned within this shell layer. After a period of pumping, desalinated water will appear in the well and may be pumped out of the well. Whenever the water in the well is pumped below a particular level, a new supply of desalinated water will flow in through the opening in its side from the barrier.

4 Claims, 1 Drawing Sheet

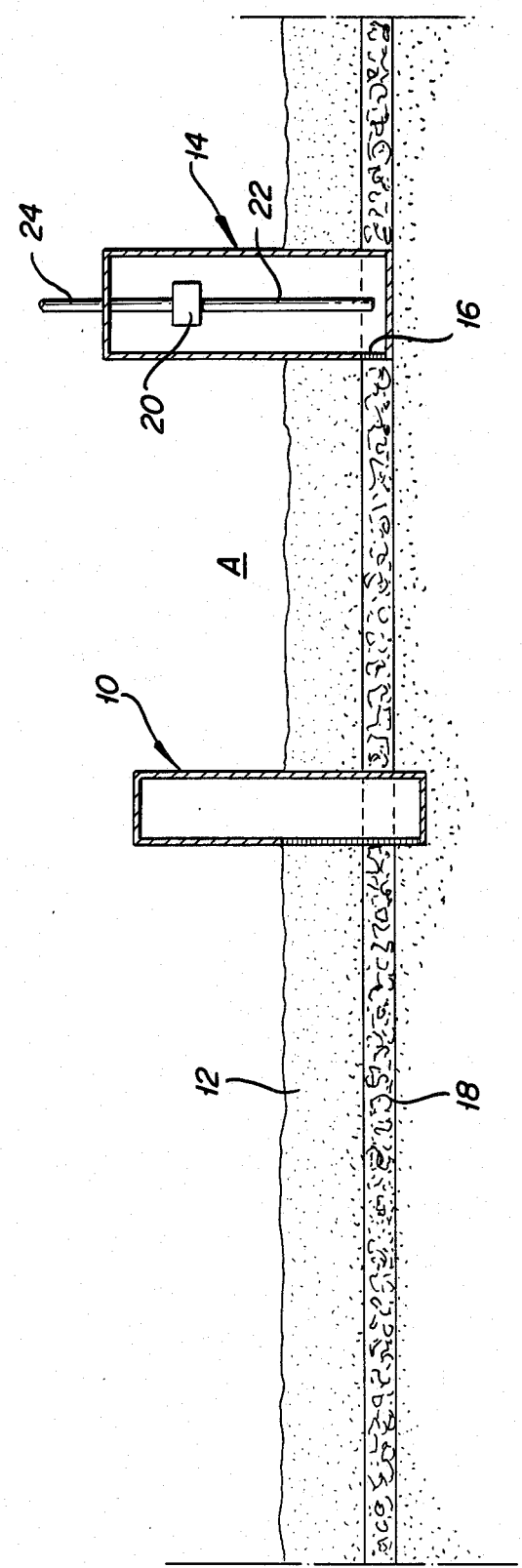

WATER DESALINIZATION PROCESS

BACKGROUND OF THE INVENTION

The present invention relates generally to a process and apparatus for the desalinization of sea water and, more particularly, to such a process and apparatus which is simple and can produce large quantities of usable desalinated water at low cost.

The term "sea water" as used herein is intended to refer to ocean water, and the like, having a sufficiently high total dissolved solid content so that the water is unusable for agricultural purposes. The term "desalinated water" used herein is intended to refer to water in which the total dissolved solids are reduced to a level sufficient to render the water at least suitable for irrigation purposes.

U.S. Pat. No. 4,122,012, the disclosure of which is incorporated herein by reference, discloses a sea water desalinization system which includes a barrier buried to a depth below the low tide water level in a sandy beach, and a collector vault or well buried in the beach behind the barrier, the vault having an opening in its side for receiving water passing through the barrier. The barrier is filled with selected filter materials and the sand in the area between the barrier and the well is treated with a selected material, such as the sap of the guayule plant. After a period of pumping, it is stated that desalinated water will appear in the well and may be pumped out of it.

While the system of U.S. Pat. No. 4,122,012 may produce some desalinated water, it cannot as a practical matter produce such water in significant or large quantities because the sand in most areas is not sufficiently porous or water-permeable to allow an adequate flow therethrough of water to the barrier and to the well. It is stated in this patent that, should the sand be very small and dense to retard water flow, it may be replaced with small size gravel to increase the water flow. The replacement of the sand with gravel, however, is both time-consuming and expensive.

A need has arisen, therefore for such a water desalinization system which can utilize the existing materials in the beach without requiring the removal or replacement of same. The process and apparatus of the present invention fills this need.

SUMMARY OF THE INVENTION

The present invention utilizes apparatus similar to that disclosed in U.S. Pat. No. 4,122,012. It has been discovered, however, that if the barrier is positioned in a layer of crushed or fossilized shells naturally occurring beneath the sand in many beach areas particularly along the western shore of North America, there is sufficient water flow through the shell layer to produce large quantities of desalinated water without having to replace the sand with gravel or other materials. The opening in the well is also positioned in the shell layer to receive water flowing therethrough from the barrier. The sap or other material applied to the sand between the barrier and the well penetrates the shell layer to further aid in the removal of dissolved solids from the water passing through the shell layer.

The system of the present invention has general utility in that it enables desalinated water to be produced in any desired quantity at negligible cost. The system is advantageous in that, apart from pumps, it does not entail any moving parts; nor does it require the introduction of heat, pressure or electricity from external power sources. In addition, the system of the invention has the capability of operating over prolonged periods of time without any noticeable deterioration of its components, and without the need for any substantial maintenance or servicing operations. In addition, the system of the invention has an advantage in that it utilizes relatively inexpensive and readily available materials in accomplishing its desired results.

Although the theoretical principles upon which the operation of the system of the invention is predicated are not completely understood, it is believed that the filter materials contained in the barrier which, in accordance with the concepts of the invention, are embedded in the sand and shell layer of a beach, set up an ion-exchange reaction in the saline or brackish solution passing through the barrier, and this ion-exchange reaction causes a desalinated water separation, with the lighter desalinated water flowing above the heavier brine or brackish solution through the shell layer and into the opening in the well which is also imbedded in the shell layer. The desalinated water passes through the opening in the side of the well and into its interior, whereas the heavier brine solution is dispersed in the sand under the barrier and the well or may be pumped to waste through an appropriate drainage system installed below the level of the barrier and the well opening.

Also, the sap of the Amate tree, family of the Ficus plants, is placed in the sand between the barrier and the well, and penetrates into the shell layer. This sap reacts with residual compounds in the sea or brackish water after passing through the barrier to cause such heavier materials to gravitate down into the brine solution underlying the upper layer of desalinated water. The only maintenance required in the system is to add additional sap to the area from time to time, depending on the amount of water that is passed through the system. In the event water quality should decrease, the addition of Amate sap to the filter materials in the barrier may be effected to reinforce the desalinating performance of the system.

BRIEF DESCRIPTION OF THE DRAWING

The drawing is a side elevational view, with parts shown in section, of the water desalinization apparatus of the present invention.

DESCRIPTION OF THE PREFERRED EMBODIMENTS

As shown in the drawing, a barrier 10 is embedded in a sandy beach 12 between an adjacent body of salt water and a well or vault 14. The well 14 is also embedded in the sand of the beach, and is displaced from the barrier 10 so as to provide an area "A" between the front side of the well and the barrier. An opening 16 is provided in the front side of the well, which opening may be covered with an appropriate screen to keep the surrounding materials out of the well.

In accordance wth the principles of the present invention, the bottom portion of the barrier 10 is embedded in and extends through a layer 18 of water permeable, crushed or fossilized shells naturally occurring in the beach area about two feet beneath the upper surface of the sand 12. Also, the well opening 16 is located within the shell layer 18 so as to receive water flowing therethrough from the barrier 10. Normally, such shell layers are about one foot thick, occur at zero tide level and contact the sea underwater at a point where the force of the waves breaking on the beach drives or pumps sea water inland through the shell layer which may extend inland from zero tide level approximately 100 meters or more. As an illustrative example, the barrier 10 should be located at least 50 meters inland from zero tide level to take advantage of the filtering action of the shell layer 18 on the sea water passing therethrough. If the length of the shell layer is 100 meters, for example, it is preferable that the barrier 10 be located about 90 meters inland and the well 14 be located inland from the barrier approximately 10 meters.

The barrier 10 is embedded at a selected depth under the sand of the beach, so that at low tide and high tide, all water flowing under the sand to the well opening 16, flows through the barrier. The well 14 preferably is displaced upwardly with respect to the barrier so that only the upper layer of water in the shell layer passing through the barrier passes through the opening 16 with the lower layer of water flowing under the well. A pump 20 is provided for pumping desalinated water out of the well through an inlet pipe 22 and an outlet pipe 24. Water velocity entering the well opening 16 is controlled by the rate of the pump 20.

As described above, selected materials aee included in the barrier 10 which react with the salt water to help form a layer of desalinated water over a layer of brine solution. Whenever the level of water in the well 14 is pumped below the level of the surrounding water table, the desalinated water flows through the opening 16 into the well so that desalinated water may be continuously pumped out of the well by pump 20 at controlled rates.

The addition of Amate tree sap to the area "A," as described above, assists in separating dissolved compounds from the layer of desalinated water into the underlying layer of brine solution Throughout area "A" and at the front of the well 14, the heavier saline solution gravitates downward and is dispersed into the underlying sands, and has to be discharged. Preferably, the sap is mixed with a suitable solution before being applied to area "A" to increase the water desalinization in the shell layer. The sap solution is applied in sufficient quantities so as to permeate both the sand and the shell layers in area "A." Additional sap solution is added to area "A" from time to time, depending on the amount of water passing through the system.

The filter materials contained in the barrier 10 preferably comprise numerous constituents that are insoluble in water and are tightly packed to form a substantially solid wall. The filter materials may comprise silicon, aluminum, iron, copper, lead and/or nickel, with lesser amounts of aluminum oxide and/or chromium. Also copper, potassium and/ or phosphorus may be added in a liquid feed.

The sap of the Amate tree is of the Ficus family and is mixed in a solution composed of latex, copper sulfate, diluted ocean water and fresh water.

When the contents of the well 14 are pumped out, water will flow through the shell layer 18 into the well through opening 16 to re-establish the static water level in the well. The barrier 10 may be formed of containers or the like which are closely fitted together to form a solid wall. The sides of the containers are perforated to permit the sea water to flow through the barrier 10 and across area "A" into the well 14, whenever the water level in the well is pumped below the static level of the surrounding water table, which will vary with the degree of tide.

The barrier containers are filled with the selected mixed filter materials. These materials do not dissolve, but act as a means to help separate the desalinated water from the saline solution, as explained above. As also explained, the area "A" between the barrier 10 and the well 14 is treated with the sap or purifying agent which acts further to keep separate dissolved compounds from the desalinated water, as the water passes into the opening 16 and 14.

The invention provides, therefore, a practical inexpensive system for rejecting the saline constituents of sea water in order to produce desalinated water appropriate for irrigation and other purposes. The system, as described, is intended to operate under the sand of an ocean or other beach where salt water normally underlies the sand and a layer of fossilized shells is present beneath the same.

Although particular embodiments of the process and apparatus of the invention have been described, the claims of the process are intended to cove all forms of desalination of sea or brackish water using the sap, in whatever form or condition utilized, of the Amate tree or other similar reacting sap.

While a particular embodiment of the invention been shown and described, modifications may be made. The following claims are intended to cover all such modifications as fall within the spirit and scope of the invention.

What is claimed:

1. In a process for the desalinization of salt water, which is used in a sandy beach adjacent to a body of salt water, the process including the steps of embedding a barrier in the beach at a depth corresponding to the changing levels of salt water in the beach, installing a well in the beach behind the barrier, the well having an opening to receive water which is passed through the barrier, providing selected filter materials in the barrier, and positioning a selected water purifying material between the well and the barrier; the improvment wherein the barrier is extended into the through a layer of fossilized shells naturally occurring beneath the beach, and the well opening is located in the shell layer to receive water flowing therethrough from the barrier.

2. The process defined in claim 1, in which the filter materials are selected from a group consisting of silicon, aluminum, iron, copper, lead, nickel, chromium, aluminum oxide, potassium, phosphoros, and mixtures thereof.

3. The process defined in claim 1, in which the water purifying material contained in the area between the well and the barrier comprises the sap of the Amate tree of the Ficus family.

4. The process defined in claim 1, in which the well is spaced from the barrier by approximately 10 meters.

* * * * *

UNITED STATES PATENT AND TRADEMARK OFFICE
CERTIFICATE OF CORRECTION

PATENT NO. : 4,789,486
DATED : Dec. 6, 1988
INVENTOR(S) : Ernesto Ritter

It is certified that error appears in the above-identified patent and that said Letters Patent is hereby corrected as shown below:

Column 4, line 47, delete "the" and substitute --and--.

Column 4, line 54, correct the spelling of "phosphoros" to --phosphorous--.

Signed and Sealed this

Twenty-first Day of March, 1989

Attest:

DONALD J. QUIGG

*Attesting Officer*  *Commissioner of Patents and Trademarks*